(12) United States Patent
Jablonski et al.

(10) Patent No.: US 11,440,483 B2
(45) Date of Patent: Sep. 13, 2022

(54) ROTATING VEHICLE DISPLAY UNIT

(71) Applicant: GM GLOBAL TECHNOLOGY OPERATIONS LLC, Detroit, MI (US)

(72) Inventors: Robert C. Jablonski, Rochester Hills, MI (US); Ki Hyun Ahn, Troy, MI (US); Joseph F. Szczerba, Grand Blanc, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 621 days.

(21) Appl. No.: 16/534,123

(22) Filed: Aug. 7, 2019

(65) Prior Publication Data
US 2021/0039562 A1 Feb. 11, 2021

(51) Int. Cl.
*B60R 11/02* (2006.01)
*H02K 7/00* (2006.01)
*F16F 9/12* (2006.01)
*F16F 9/53* (2006.01)
*G09G 5/38* (2006.01)
*B60R 11/00* (2006.01)

(52) U.S. Cl.
CPC .......... *B60R 11/0235* (2013.01); *F16F 9/125* (2013.01); *F16F 9/535* (2013.01); *G09G 5/38* (2013.01); *H02K 7/003* (2013.01); *B60R 2011/0005* (2013.01); *B60R 2011/0085* (2013.01); *B60R 2011/0092* (2013.01); *F16F 2222/06* (2013.01); *F16F 2224/045* (2013.01); *F16F 2228/066* (2013.01); *F16F 2230/18* (2013.01); *F16F 2230/30* (2013.01); *F16F 2232/02* (2013.01); *F16F 2234/06* (2013.01); *F16F 2236/106* (2013.01); *G09G 2340/0492* (2013.01); *G09G 2380/10* (2013.01)

(58) Field of Classification Search
None
See application file for complete search history.

(56) References Cited

U.S. PATENT DOCUMENTS

| 10,400,778 | B2* | 9/2019 | Garvin | F04D 29/043 |
| 11,154,703 | B2* | 10/2021 | Timms | A61M 60/122 |
| 2015/0159503 | A1* | 6/2015 | Leininger | C10J 3/723 60/435 |
| 2017/0247107 | A1* | 8/2017 | Hauer | B64D 35/06 |
| 2019/0331236 | A1* | 10/2019 | Singh | A61M 60/148 |

* cited by examiner

*Primary Examiner* — Toan H Vu

(57) ABSTRACT

A system and method that pertain to a rotating vehicle display unit that can automatically or manually rotate between landscape and portrait orientations, depending on the particular display format or media being shown to the vehicle occupants. The rotating vehicle display unit uses an electro-mechanical rotating and locking mechanism with smart fluid, such as magnetorheological fluid (MR), to facilitate easy and precise rotational movement between different display orientations. The rotating vehicle display unit may be coupled to a corresponding human-machine interface (HMI) that responds to the different display orientations and helps facilitate easy transition from one orientation to another in order to optimize the particular display format or media being shown at that time.

20 Claims, 5 Drawing Sheets

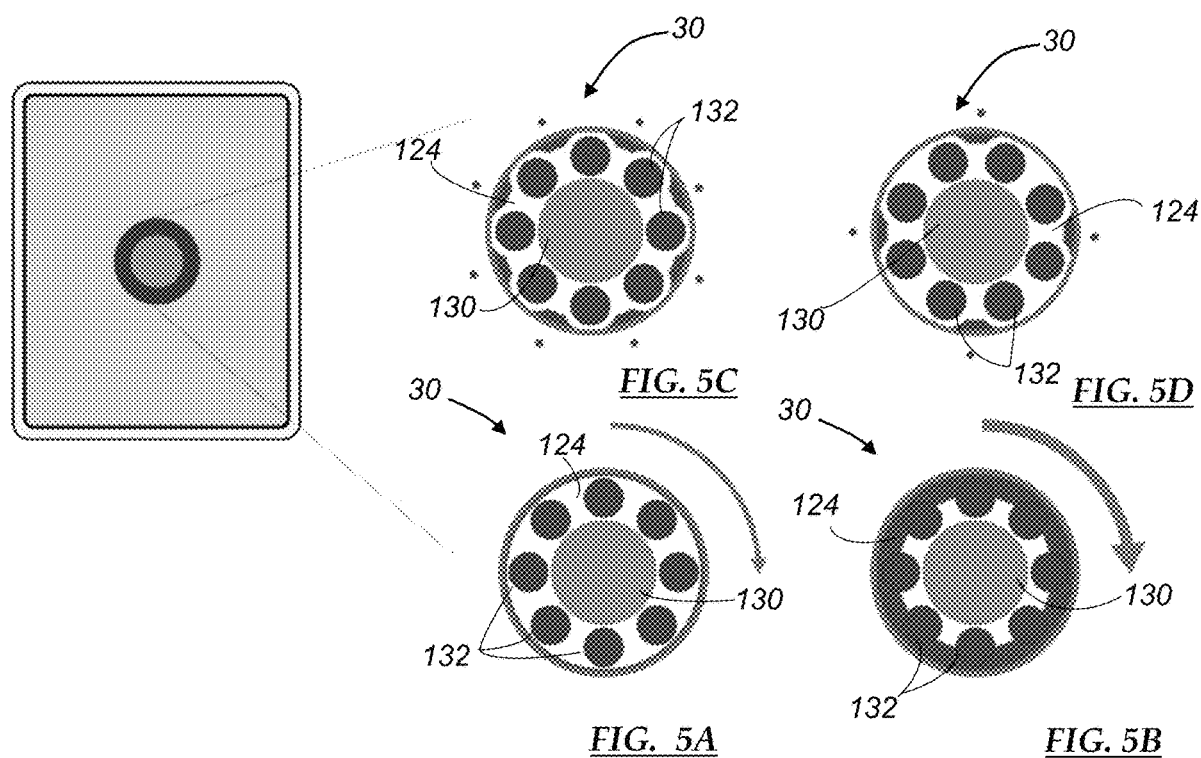

ROTATING VEHICLE DISPLAY UNIT

TECHNICAL FIELD

The present disclosure relates to vehicle display units and, in particular, to vehicle display units that can automatically or manually rotate between landscape and portrait orientations to optimize different display formats.

BACKGROUND

Vehicle infotainment systems provide passengers with a wide variety of information, such as navigation maps, camera views, icons, various types of lists, etc. Some of this information is best presented to passengers in a portrait orientation, whereas other information is better suited to a landscape orientation. Despite these differences in preferred display orientations, most vehicle display units are fixed in a particular orientation such that they cannot accommodate any other orientations.

Thus, there is a need for a vehicle display unit that can easily transition between portrait and landscape display orientations in order to optimize the display format of the information being presented to the passengers.

SUMMARY

According to one aspect, there is provided a rotating vehicle display unit, comprising: a housing; an electric coil; a rotating disk that is located in the housing; a smart fluid that is located in the housing and at least partially surrounds the rotating disk, the smart fluid includes a plurality of magnetic particles suspended in a carrier fluid so that the viscosity of the smart fluid is affected by the presence of a magnetic field; and a rotating shaft that is connected to the rotating disk and is configured to carry an electronic display, wherein when the electric coil is energized, the electric coil creates a magnetic field that permeates the smart fluid and increases the viscosity of the smart fluid so that the smart fluid resists rotation of the rotating disk within the housing.

According to various embodiments, the rotating vehicle display unit may further include any one of the following features or any technically-feasible combination of some or all of these features:
the housing includes at least one opening with a dynamic hermetic seal, the rotating shaft extends through the opening and the dynamic hermetic seal seals around the rotating shaft so that the rotating shaft can rotate without the smart fluid leaking from the housing;
the electric coil circumferentially surrounds the rotating disk, the smart fluid, and the rotating shaft and is configured so that, when energized, the electric coil creates the magnetic field with magnetic flux lines that permeate the smart fluid throughout the housing;
the rotating disk is disk shaped and includes a hole in a middle of the disk and a smooth outer circumferential surface, the hole is sized and shaped to accommodate the rotating shaft and the smooth outer circumferential surface is configured to rotate against one or more bearings that are located in the housing;
the rotating disk includes one or more holes or perforations that are formed in planar surfaces of the rotating disk and, in which, the smart fluid is present, the holes or perforations increase interaction with the smart fluid;
the smart fluid is a magnetorheological (MR) fluid with the plurality of magnetic particles suspended in the carrier fluid, and when the magnetic field permeates the MR fluid it can increase the viscosity of the MR fluid to the point of a viscoelastic solid;
an electric motor, wherein the electric motor is mounted to the housing and is connected to the rotating shaft so that, when activated, the electric motor turns the rotating shaft and rotates an electronic display between portrait and landscape display orientations; and
an electronic display, wherein the electronic display is connected to and carried by the rotating shaft and is able to display content in either portrait or landscape display orientations.

According to another aspect, there is provided a method for use with a rotating vehicle display unit mounted in a vehicle, the rotating vehicle display unit includes a housing, an electric coil, a rotating disk that is located in the housing, a smart fluid that is located in the housing and at least partially surrounds the rotating disk, where smart fluid includes a plurality of magnetic particles suspended in a carrier fluid so that the viscosity of the smart fluid is affected by the presence of a magnetic field, and a rotating shaft that is connected to the rotating disk and is configured to carry an electronic display, the method comprising the steps of: detecting a change in system input information intended for the rotating vehicle display unit; selecting an optimal display orientation for the system input information; determining if the rotating vehicle display unit is currently in the optimal display orientation; when the rotating vehicle display unit is currently in the optimal display orientation, then maintaining the rotating vehicle display unit in its current orientation; and when the rotating vehicle display unit is not currently in the optimal display orientation, then rotating the rotating vehicle display unit from its current orientation to the optimal orientation.

According to various embodiments, the method may further include any one of the following features or any technically-feasible combination of some or all of these features:
the detecting step further comprises detecting at least one of the following changes in system input information: a change in a presence of system input information, a change in a source of system input information, or a change in content or format of system input information;
the selecting step further comprises determining the optimal display orientation for a system input with a pre-defined orientation by retrieving pre-defined orientation information from a memory device located on the vehicle;
the selecting step further comprises determining the optimal display orientation for a system input with a non-defined orientation by comparing the number of pixels driven versus the number of pixels available to obtain a pixel ratio for each possible display orientation, and then selecting the optimal display orientation based on the pixel ratio;
the selecting step further comprises determining the optimal display orientation for a system input with a non-defined orientation by evaluating the amount of content displayed for each possible display orientation, and then selecting the optimal display orientation based on the orientation that displays the most content;
the selecting step further comprises determining the optimal display orientation for a system input with a non-defined orientation by obtaining user preferences or aggregate past histories of users for a particular system input, and then selecting the optimal display orientation based on the obtained user preferences or aggregate past histories;
the maintaining step further comprises energizing an electric coil such that a magnetic field is established, increasing the viscosity of smart fluid in response to the magnetic field, and locking the rotating vehicle display unit in the current orientation in response to the increased viscosity of the smart fluid;

the rotating step further comprises deenergizing an electric coil such that a magnetic field is not established or is reduced, decreasing the viscosity of smart fluid in response to the lack of or reduced magnetic field, unlocking the rotating vehicle display unit in response to the decreased viscosity of the smart fluid, and engaging an electric motor to rotate the rotating vehicle display unit from the current orientation to the optimal orientation;

further comprising the steps of: determining if a user wants to change a current orientation of the rotating vehicle display unit; and when the user wants to change the current orientation of the rotating vehicle display unit, then controlling a magnetic field created by the electric coil so that the smart fluid exhibits a viscosity that allows the user to manually engage and turn the rotating vehicle display unit to a desired orientation;

the step of controlling the magnetic field created by the electric coil further comprises adjusting a resistance presented by the smart fluid against rotation of the rotating vehicle display unit;

the amount of resistance presented by the smart fluid is a function of the amount of torque exerted by the user on the rotating vehicle display unit; and the step of controlling the magnetic field created by the electric coil further comprises providing a plurality of detents at different rotational positions, where the detents are created by the smart fluid.

BRIEF DESCRIPTION OF THE DRAWINGS

One or more embodiments of the disclosure will hereinafter be described in conjunction with the appended drawings, wherein like designations denote like elements, and wherein:

FIG. 1A shows the rotating vehicle display unit in a portrait orientation and FIG. 1B shows the rotating vehicle display unit in a landscape orientation;

FIG. 3A is a perspective view of the display unit and FIG. 3B is a sectional view of the display unit;

FIGS. 5A-5D illustrate different embodiments of a rotating vehicle display unit having controllable resistance and detents.

DETAILED DESCRIPTION OF THE ILLUSTRATED EMBODIMENT(S)

The system and method described herein pertain to a rotating vehicle display unit that can automatically or manually rotate between landscape and portrait orientations, depending on the particular display format or media being shown to the vehicle occupants. The rotating vehicle display unit uses an electro-mechanical rotating and locking mechanism with magnetorheological fluid (MR) to facilitate easy and precise rotational movement between the different display orientations. According to one example, the rotating vehicle display unit is coupled to a corresponding human-machine interface (HMI) that responds to the different display orientations and helps facilitate easy transition from one orientation to another in order to optimize the particular display format or media being shown at that time. Other examples and embodiments are certainly possible, as described below in more detail.

Figure 1A:
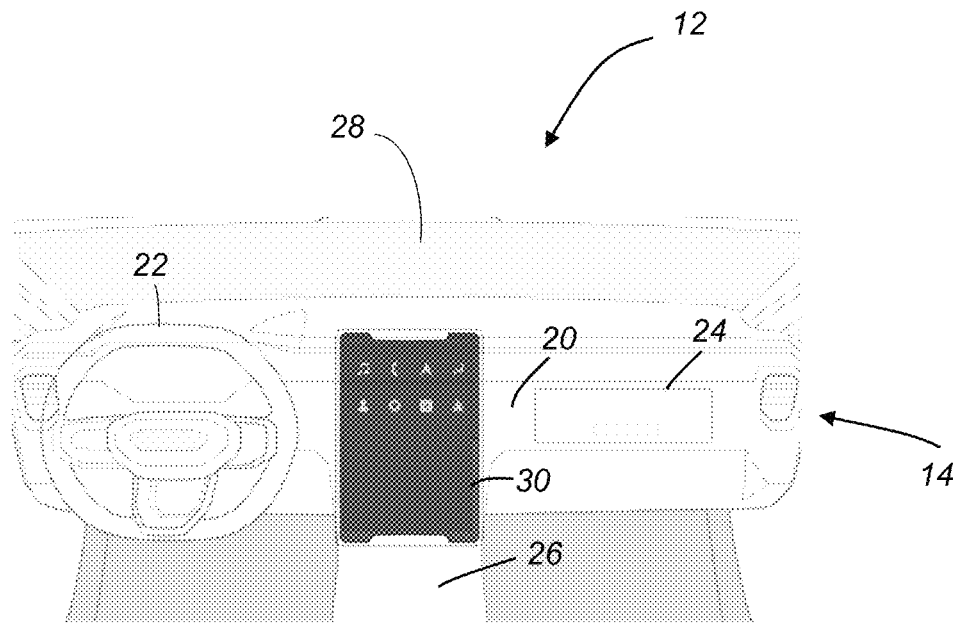
FIGS. 1A and 1B are schematic illustrations of a vehicle dash panel and an embodiment of the rotating vehicle display unit of the present application, where
Figure 1B:
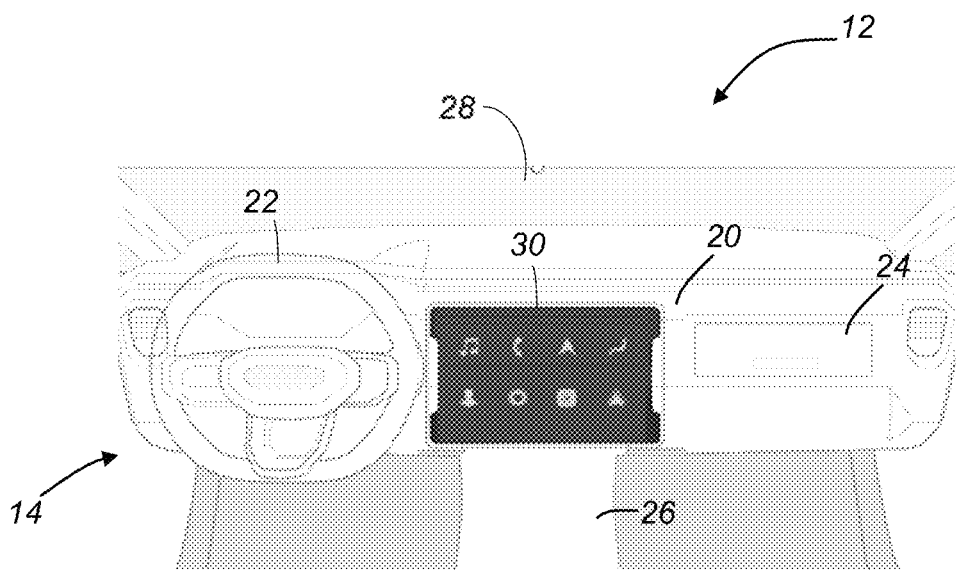

Vehicle 12 may be a truck, a sports utility vehicle (SUV), a cross over vehicle, a passenger vehicle, a compact vehicle, a traditional internal combustion engine vehicle, a hybrid vehicle, an electric vehicle, a traditional manual driving vehicle, a semi-autonomous vehicle, a self-driving or fully autonomous vehicle, or any other suitable vehicle such as a tractor unit of a semi-truck, a recreational vehicle (RV), a motorcycle, etc. With reference to FIGS. 1A and 1B, there is shown a portion of a vehicle interior or passenger cabin 14 that includes a dash or instrument panel 20, a steering wheel 22, a glove compartment 24, a center console 26, a windshield 28, and a rotating vehicle display unit 30, where FIG. 1A shows the rotating vehicle display unit in a portrait orientation and FIG. 1B shows the unit in a landscape orientation. Since the dash panel 20, steering wheel 22, glove compartment 24, center console 26, and windshield 28 are all well known vehicle components and because the rotating vehicle display unit 30 can be used with any combination of such components and is not limited to any particular vehicle interior cabin 14, these components are not described herein in great detail.

It should be pointed out, however, that the location and spacing of the rotating vehicle display unit 30 should be such that it may freely rotate between the different display orientations without interference from the dash panel 20, the steering wheel 22 and/or the center console 26, and without obstructing access to the glove compartment 24 or obstructing a view out of the windshield 28. According to the non-limiting example shown in FIGS. 1A and 1B, the rotating vehicle display unit 30 is mounted to the dash panel 20, which is a vertical or largely vertical surface. But it is possible for the rotating vehicle display unit 30 to be mounted instead to a horizontal or largely horizontal surface, such as the center console 26. The viewing angle of the rotating vehicle display unit 30 may also change according to the time of day (e.g., to address issues of the display being washed out by sunlight), to accommodate different combinations of passengers (e.g., pointed more at the driver if no passenger), or according to any number of other factors.

Figure 2:
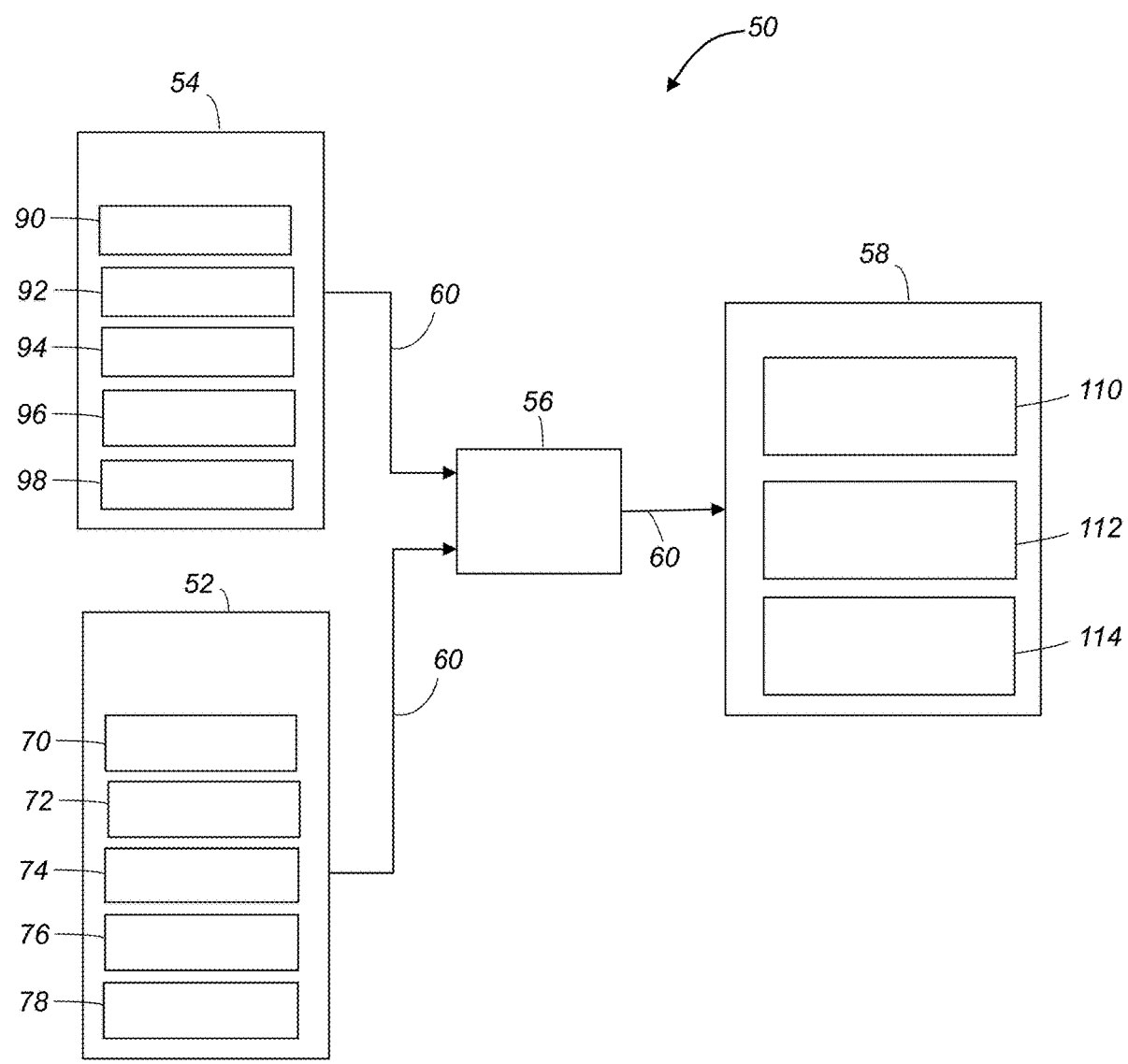
FIG. 2 is a schematic block diagram of an embodiment of a vehicle display system that may be used with the rotating vehicle display unit in FIGS. 1A and 1B.

Turning now to FIG. 2, there is shown a schematic block diagram of a vehicle display system 50 that may be used with and/or to control the rotating vehicle display unit 30. According to one embodiment, the vehicle display system 50 includes a number of system inputs with pre-defined orientations 52, a number of system inputs with non-defined orientations 54, an on-board processing unit 56, a number of system outputs 58, and a vehicle communication bus 60 (e.g., a controller area network (CAN), a media oriented system transfer (MOST), a local interconnection network (LIN), a local area network (LAN), etc.).

System inputs 52 correspond to content with pre-defined orientations and may originate from within the vehicle or outside of the vehicle. Some non-limiting examples of system inputs 52 include, but are not limited to: a media input 70 (e.g., from an on-board DVD player), a camera input 72 (e.g., from a vehicle backup camera), a locally stored map or global positioning system (GPS) input 74, a radio input 76, a heating/ventilation/air conditioning (HVAC) input 78, etc. One common feature of system inputs 52 is that, for each of these inputs, there is a preferred or optimized orientation associated with the input that is already pre-defined. Considering the media input 70 or the camera input 72, for example, these inputs may be provided in such a manner that when one of them sends content to system 50 in the form of video from an on-board DVD player or video from a vehicle backup camera, it is pre-defined or predetermined that the content will be presented in a landscape orientation. According to a different example, camera input 72 may provide system 50 with video from a birds-eye camera, which may have a pre-defined portrait orientation. Most of the system inputs 52 are typically on board inputs provided by the vehicle manufacturer, but this is not necessary. The system inputs 52 can be associated with either portrait or landscape orientations, so long as the preferred or optimized display orientation is pre-defined and already known. This is different than system inputs 54, where the preferred display orientation is non-defined such that the system 50 has to go through a process to determine it, as described below.

System inputs 54 correspond to content with non-defined orientations and may originate from within the vehicle or outside of the vehicle. Some non-limiting examples of system inputs 54 include, but are not limited to: a subscription based communications input 90 (e.g., OnStar®), a cellular based communications input 92, an internet input 94, a short range wireless input 96 (e.g., Bluetooth®), a vehicle-to-vehicle (V2V) input 98, etc. For most system inputs 54 where the preferred display orientation is not known or defined in advance, the inputs are off board or bring aboard inputs provided by various equipment manufacturers. For each of these examples, the system 50 will have to determine which display orientation is most suitable, as that information will not be conveyed with the underlying content. One way to determine the preferred display orientation is through the use of an aspect ratio for the information being displayed, which is the ratio of the width to height of the associated image. The process of determining which display orientation is preferable is discussed below in more detail. Skilled artisans will appreciate that any number of different combinations of pre-defined and non-defined system inputs 52, 54 may be used in conjunction with the rotating vehicle display unit 30, and that the present application is not limited to the exemplary combination specifically depicted in FIG. 2.

On-board processing unit 56 is coupled to the various system inputs 52, 54 and system outputs 56, includes one or more processors and memory devices, and is designed to process various types of information and control one or more aspects of the vehicle display system 50 in response thereto. For instance, the on-board processing unit 56 may be designed to process incoming information from one or more system inputs 52, 54, identify the input that is to be displayed on the rotating display unit 30, determine the preferred or optimal display orientation for that particular input, and then send one or more command signals to the display unit 30 so that it is rotated and locked into position. The on-board processing unit 56 may include a suitable human-machine-interface (HMI) processor and it may be part of a larger infotainment module or virtual cockpit unit (VCU), to cite a few possibilities. The on-board processing unit 56, as well as any other processors discussed herein, can include any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. The processing unit 56 can execute various types of electronic instructions, such as software and/or firmware programs stored in memory, which enable the system 50 to carry out various functionality. The on-board processing unit 56 may also include combination of memory devices, including non-transitory computer-readable medium; these include different types of random-access memory (RAM), such as various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. Although on-board processing unit 56 may be described as including a processor and/or memory, the processor and/or memory of such unit may be shared with other devices, units, modules, systems, etc.—for example, the processor and/or memory described above can be a dedicated processor and/or memory used only for unit 56 or can be shared with other vehicle systems, modules, devices, components, etc.

System outputs 58 correspond to various command signals that are generated by on-board processing unit 56 and are sent to different components or devices within vehicle display system 50. According to one non-limiting example, the system outputs 58 include a lock/unlock signal 110, a display rotation signal 112, and a user interface signal 114. The lock/unlock signal 110 may be sent to an electric coil within the rotating vehicle display unit 30 in order to establish a magnetic field that, in turn, controls the viscosity of smart fluid (e.g., magnetorheological (MR) fluid) within the unit. When the lock/unlock signal 110 causes the electric coil to establish the magnetic field and activate the smart fluid, it becomes extremely viscous and "locks" the rotating vehicle display unit 30 in place so that it cannot rotate. Conversely, when the lock/unlock signal 110 turns the electric coil off and collapses the magnetic field, this deactivates the smart fluid so that it becomes much less viscous and thereby "unlocks" the rotating vehicle display unit 30 so that it can turn or rotate between display orientations. The display rotation signal 112 is a command signal that is sent to a motor, such as a servo motor, and causes the motor to rotate display unit 30 between different display orientations. The user interface signal 114, on the other hand, is a signal that may be sent to an HMI platform and/or some other user interface so that there can be coordination between the devices and so the interface can respond to the current display orientation. The aforementioned system outputs 58 are only exemplary, as others are certainly possible, and they will be subsequently discussed in more detail.

Skilled artisans will appreciate that the schematic block diagram of the vehicle display system 50 is simply meant to illustrate some of the more relevant hardware components that may be used and it is not meant to be an exact or exhaustive representation of the hardware that would typically be found on such a vehicle. Furthermore, the actual structure or architecture of the vehicle display system 50 may vary substantially from that illustrated in FIG. 2. Thus, because of the countless number of potential arrangements and for the sake of brevity and clarity, the vehicle display system 50 is described in conjunction with the illustrated embodiment of FIG. 2, but it should be appreciated that the present rotating vehicle display unit and method are not limited to such.

Figure 3A:
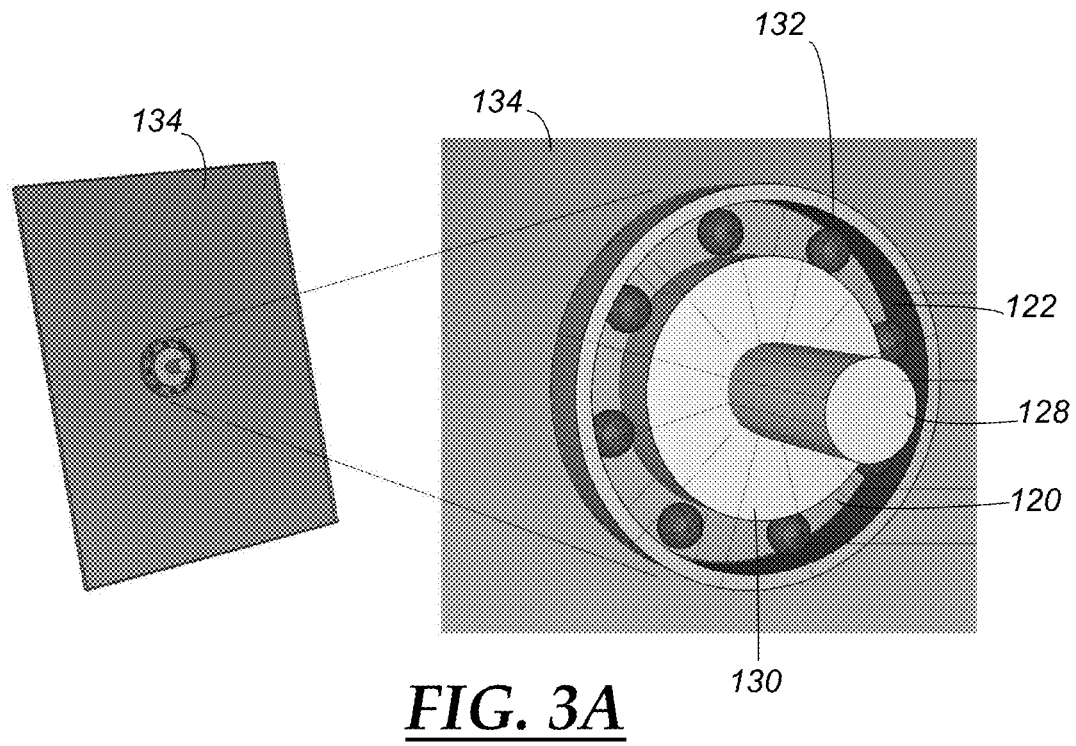
FIGS. 3A and 3B are schematic illustrations of the rotating vehicle display unit of FIGS. 1A and 1B, where
Figure 3B:
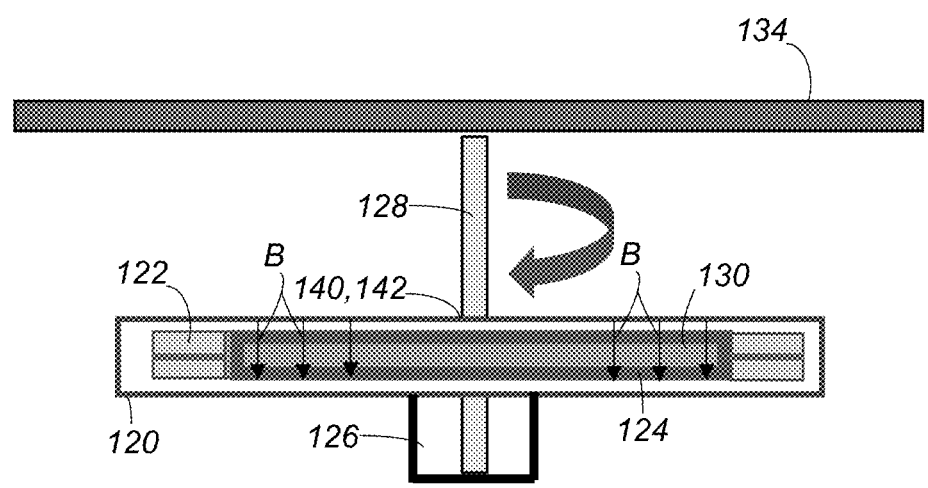

Turning now to FIGS. 3A and 3B, there are shown perspective and sectional schematic views, respectively, of the rotating vehicle display unit 30. The rotating vehicle display unit 30 acts as an electro-mechanical rotating and locking mechanism with smart fluid (e.g., magnetorheological (MR) fluid) that enables an electronic display to be rotated between different display orientations (e.g., portrait and landscape) so as to optimize a certain display format, and locks the electronic display in place once the desired orientation has been achieved. According to one embodiment, the rotating vehicle display unit 30 includes a housing 120, an electric coil 122, smart fluid 124, an electric motor 126, a rotating shaft 128, a rotating disk 130, bearings 132, and an electronic display 134.

Housing 120 is an enclosure that is designed to carry and protect certain components of the rotating vehicle display unit 30, such as the electric coil 122, the smart fluid 124, the rotating disk 130, and the bearings 132. All or portions of the electric motor 126 and/or the rotating shaft 128 may also be provided within the housing 120, but this is optional. Because housing 120 maintains the smart fluid 124, the housing may need to be hermetically sealed in a way that enables the rotating disk 130 and the rotating shaft 128 to turn within the housing, but not leak any of the smart fluid. In one example, the housing 120 is generally disc shaped and includes an opening or through hole 140 located towards the middle of the housing for rotating shaft 128, as well as a dynamic hermetic seal 142, such as some type of dynamic O-ring, that seals around the rotating shaft. Of course, different sealing and/or other features may also be employed in order to provide the housing 120 with the sealing and/or properties needed.

Electric coil 122 is configured to establish, collapse and/or otherwise control a magnetic field B that permeates the smart fluid 124. According to one example, the electric coil 122 is located and mounted within housing 120 such that it circumferentially surrounds the smart fluid 124, the rotating shaft 128, and the rotating disk 130, and the electric coil is electrically coupled to the lock/unlock signal 110 of the system outputs. The electric coil 122 may include any suitable combination of electrical parts and components needed to create, collapse and/or otherwise control a magnetic field B. Skilled artisans will appreciate that the electric coil 122 may be arranged in any number of different coil configurations, it may have any number of windings or turns, it may be provided with or without a magnetic core (i.e., a ferromagnetic core) to increase the strength of the magnetic field B, and it is not limited to any particular embodiment, so long as it can establish, collapse and/or otherwise control a suitable magnetic field B to permeate or extend into the smart fluid 124.

Smart fluid 124 is a type of fluid, such as a magnetorheological (MR) fluid, whose viscosity is affected by the presence of a magnetic field. For example, when the smart fluid 124 is subjected to the magnetic field B, the smart fluid becomes active such that its viscosity can increase quickly and substantially to the point that it acts as a type of solid (e.g., a viscoelastic solid); in this state, the rotating shaft 128 and rotating disk 130 would be locked in place. When the magnetic field B is collapsed or otherwise removed, the smart fluid 124 becomes much less viscous such that the rotating parts are free to move; in this state, the rotating shaft 128 and rotating disk 130 would be unlocked. It should be recognized that the state of the smart fluid 124 is not binary (i.e., it is not limited to active or inactive, locked or unlocked, etc.), but rather the viscosity can be precisely controlled by controlling the strength or intensity of the magnetic field B; this is explained below in more detail. Typically, the smart fluid 124 includes a number of small magnetic particles (e.g., micro- or nano-scale sized particles) that are suspended in a non-magnetic carrier fluid, such as an oil which can also help to lubricate the rotating disk. When the magnetic field B permeates the smart fluid 124, the small magnetic particles align themselves along magnetic flux lines in a manner that increases the viscosity of the carrier fluid. It should be appreciated that the fluid 124 is not strictly limited to a MR fluid, as other suitable types of smart fluids, such as electrorheological (ER) fluids or ferrofluids may be used instead.

Electric motor 126 is designed to rotate, turn and/or otherwise move the electronic display 134 between different display orientations, such as portrait and landscape orientations. The electronic motor 126 may be mounted to the housing 120, operably attached to the rotating shaft 128, and electronically coupled to display rotation signal 112 such that, during operation, the electric motor rotates the shaft and, ultimately, the electronic display 134. The electric motor 126 may include any suitable electrical motor type and, if possible, the electric motor should be bi-directional such that it can turn the rotating shaft 128 in either a clockwise or counterclockwise direction. It should be recognized that any number of different electric motor types may be used and that electric motor 126 is not limited to any particular one.

Rotating shaft 128, as its name suggests, is a shaft or rod that can rotate under the output of the electric motor 126 so as to rotate the electronic display 134. In one example, the rotating shaft 128 is coupled to the output of the electric motor 126, extends through a backside opening in the housing 120 so that it can be fixedly connected to the rotating disk 130 located within the housing, extends out of the frontside opening 140 in the housing, and is fixedly connected to the electronic display 134. When the electric motor 126 is driven, it creates an output torque that rotates the rotating shaft 128, rotating disk 130 and the electronic display 134, so long as the smart fluid 124 is not so viscous that it prevents such rotation. In an alternative arrangement, it is possible for the electric motor 126 to be mounted on the opposite side of the housing 120 that is shown in FIG. 3B such that it is located in between housing 130 and the electronic display 134. In such an arrangement, it would only be necessary for the rotating shaft 128 to extend through the frontside opening 140 in the housing. Of course, numerous other arrangements and configurations are possible.

Rotating disk 130 is best illustrated in FIG. 3A, which shows the inside of rotating vehicle display unit 30 due to a portion of the housing 120 being removed. As explained above, the rotating disk 130 is fixedly connected to the rotating shaft 128 so that the two components can co-rotate under the output of the electric motor 126. In the illustrated embodiment, rotating disk 130 is simply a solid, disk shaped component with a hole in the middle to accommodate the shaft 128, and a smooth outer circumferential surface to smoothly engage the various bearings 132. With this arrangement, the rotating disk 130 can easily rotate within the housing 120 with little friction due to the bearings 134. It is also possible, however, for the rotating disk 130 to include one or more features to increase the interaction with the smart fluid 124, which surrounds the disc. For example, the rotating disk 130 may include a number of holes, perforations and/or other features formed in the planar surfaces of the disk so that the smart fluid can flow into such features. When there is no magnetic field B, the smart fluid 124 located in the holes or perforations will not present much of a frictional obstacle to rotation, since the viscosity of the smart fluid in that state is quite low. But when there is a substantial magnetic field B permeating the smart fluid 124, including the fluid residing in the holes or perforations, the viscosity of the fluid will increase and, thus, become a substantial obstacle to rotation. This represents a locked position. Other features of the rotating disk 130, such as detents spaced along the outer circumferential surface, are certainly possible as well.

Bearings 134 reduce the friction between the rotating disk 130 and the housing 120 and may include any suitable bearing type known in the art, such as the ball bearings illustrated in FIG. 3A.

Electronic display 134 provides the passengers with a graphical interface that, depending on the particular application, can output information to the passengers (e.g., when display 134 is showing movie or other media content from system input 70), can input or gather information from the passengers (e.g., when display is a touch screen display and is gathering passenger input or instructions), or can act as both an input/output device. According to a non-limiting example, the electronic display 134 is a . . . type of display and is electronically coupled to the user interface signal 114 so that the display and the on-board processor 56 can be coordinated with one another. Electronic display 134 may include any type of suitable display technology including, but not limited to, resistive touch screen and capacitive touch screen technologies. It should be recognized that the electronic display 134 is not limited to any particular type, technology, size, etc.

Figure 4:
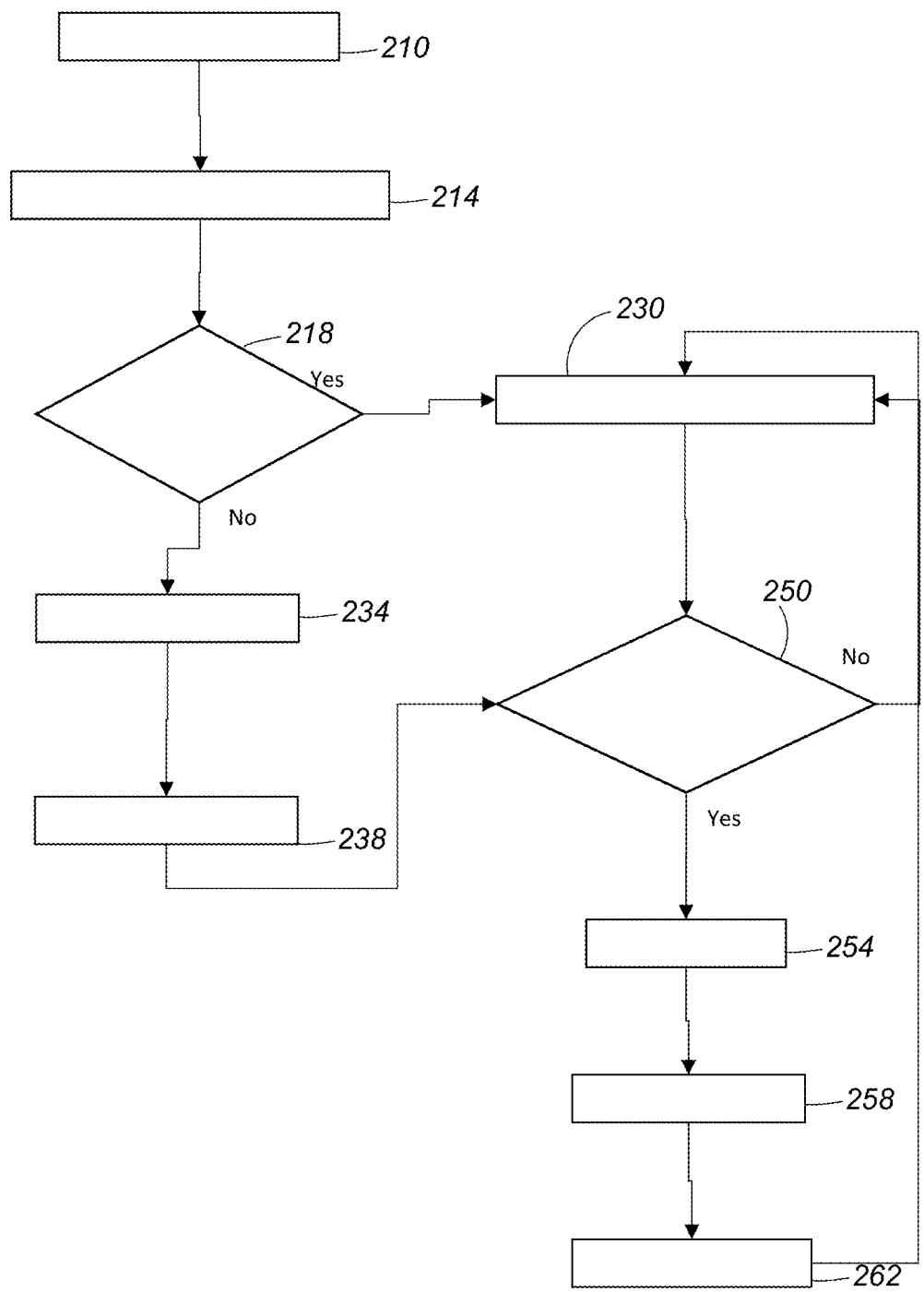
FIG. 4 is a flowchart depicting an embodiment of a method that may be used with the vehicle display system of FIG. 2.

With reference to FIG. 4, there is shown an embodiment of a method 200 that may be used with the vehicle display system 50. Generally speaking, method 200 automatically determines the optimal display orientation for a particular system input and then, based on that determination, automatically rotates or transitions the rotating vehicle display unit 30 to the optimal orientation. Method 200 may also allow for manual rotation, in the event that a passenger grabs or otherwise physically engages the rotating vehicle display unit and manually rotates it a desired orientation. Much of the following method may be carried out with electronic instructions that are stored at and/or executed by the on-board processing unit 56, although this is not required.

Starting with step 210, the method detects a change in the system input information that is intended for the rotating vehicle display unit 30. There are numerous examples of such changes that may be detected by step 210, including: changes in the presence of system input information, changes from one source of system input information to another, and changes in the content or format of system input information even though the source does not change, to cite a few examples. For instance, if the display unit 30 is initially 'off' and then a passenger turns it 'on', step 210 may detect this change in the presence of system input information. In a different example, if the display unit 30 is initially connected to one system input (e.g., the media system input 70) and a passenger selects a different system input for the display unit (e.g., the camera system input 72), this change in system input information may be detected by step 210. In yet another example, if the display unit 30 is connected to the media system input 70 and is receiving media content designed for a portrait orientation (e.g., at the beginning of a movie, where users are presented with a menu or list of options pertaining to the movie), and then starts receiving media content from the same system input that is designed for a landscape orientation (e.g., when the movie begins playing), then this change in content or format may be detected by step 210. The change in system input information detected by step 210 may act as a sort of trigger or initiating event that causes the method to then try and determine the optimal display orientation. Of course, step 210 may detect other changes in system inputs and/or system input information, as the aforementioned examples only represent some of the possibilities.

Once the method has detected some type of change in system input information, step 214 then selects an optimal display orientation for the system input information, and may do so differently for system inputs with pre-defined orientations versus those with non-defined orientations. Starting with system inputs with pre-defined orientations, these typically refer to inputs where the optimal or desired display orientation is already defined, whether it be defined by the manufacturer, by a user (e.g., in stored preferences), or otherwise. As mentioned above, examples of inputs with pre-defined orientations may include: a media input 70, a camera input 72, a locally stored map or global positioning system (GPS) input 74, a radio input 76, a heating/ventilation/air conditioning (HVAC) input 78, etc. If step 214 determines that the system input information to be displayed is of the pre-defined orientation type, then the method simply uses the pre-defined display orientation as the optimal or desired orientation, for example, by retrieving pre-defined orientation information from a memory device located on the vehicle. If, however, step 214 determines that the system input information is of the non-defined orientation type, then the step must further evaluate the information in question in order to select the optimal display orientation.

One technique for selecting the optimal display orientation for non-defined system inputs is through the use of a 'pixel ratio' that is the ratio of pixels used (i.e., driven) versus pixels available. If the pixel ratio for a certain system input is higher in one display orientation than in the other, then the orientation with the higher pixel ratio is likely the optimal display orientation to use. In a different example, step 214 may determine the pixel ratio for a certain system input in one of the two display orientations, and if the pixel ratio is higher than a predetermined threshold, then step 214 may conclude that this orientation is optimal. According to another possible technique, step 214 may compare the amount of content displayed in each of the two display orientations and conclude that the orientation that displays the most is optimal (e.g., if a list displays three items in landscape, but displays six items in portrait, then the portrait orientation may be optimal). Other techniques, such as those that evaluate the aspect ratio of the content or evaluate the learned past behavior of users for a particular system input, those that aggregate the past histories of many users on similarly equipped vehicles, and those that consider the personal preferences of a specific user (e.g., preferences that move with the user from vehicle to vehicle) may also be employed by step 214 to determine the optimal display orientation.

It is also possible for step 214 to use a default display orientation, and it may do so in several different ways. For instance, step 214 may utilize a default display orientation by system input or media type (e.g., the cellular system input 92 may utilize the portrait orientation as a default, since this input typically provides vertical lists and the like). Step 214 may also assign default display orientations on the basis of application or app type (e.g., if the system input being displayed is coming from an email app, then a portrait orientation may be assigned as a default). Default orientations based on information content is also possible (e.g., text vertical lists use the portrait orientation as a default, whereas text sentences or emails use the landscape orientation as a default). Once the optimal display orientation has been determined, method progresses to the next step.

In step 218, the method determines if the current display orientation of the rotating vehicle display unit 30 is in the optimal display orientation, as determined in the previous step. To illustrate this decision step, consider the example where the current display orientation is a portrait orientation (i.e., the rotating vehicle display unit 30 is currently in an upright portrait orientation) and the optimal display orientation, as determined in the previous step, is also a portrait orientation. In this example, step 218 would conclude that the current display orientation is the same as the optimal display orientation, and the method would progress to step 230 such that the rotating vehicle display unit 30 would remain in its current orientation. One way for step 230 to maintain the rotating vehicle display unit 30 in its current orientation is for the on-board processing unit 56 to use the lock/unlock signal 110 to control the electric coil 122 such that it establishes and/or maintains a magnetic field B that, in turn, activates the smart fluid 124 so that it becomes extremely viscous and "locks" the rotating vehicle display unit 30 in the current orientation.

If, on the other hand, the current display orientation is a portrait orientation, but the optimal display orientation is a landscape orientation, then the method may progress to step 234 so that the rotating vehicle display unit 30 can be transitioned to the optimal orientation. In order to carry out step 234, the on-board processing unit 56 may use the lock/unlock signal 110 to turn the electric coil 122 off and collapse the magnetic field B; this can deactivate the smart fluid 124 so that it becomes much less viscous and thereby "unlocks" the rotating vehicle display unit 30 so that it can be turned or rotated. With the display unit 30 unlocked, the on-board processing unit 56 may then use the display rotation signal 112 to control electric motor 126 and instruct it to rotate the display unit to the landscape orientation (i.e., the optimal orientation). The rotational direction, rotational or angular distance (e.g., 90°), rotational speed, rotational acceleration/deceleration, as well as any other parameter used to control the rotation or movement of the display unit 30 between different orientations, may be predetermined by the manufacturer, may be set by the users, may be adapted and changed during use based on various sensed factors, or may be determined in some other suitable fashion. Once in the optimal orientation, the on-board processing unit 56 may again use the lock/unlock signal 110 to energize the electric coil 122, create the magnetic field B, and lock the smart fluid 124 so that the display unit 30 is rotationally locked in place.

Next, step 238 causes the user interface to adapt to the new display orientation of the rotating vehicle display unit 30. According to one example, the on-board processing unit 56 sends a user interface, such as a vehicle infotainment module or an HMI platform (not shown), the user interface signal 114 so that there can be coordination between the devices and so that the user interface can adapt, if necessary, to the new display orientation. In some instances, the user interface may need to make adjustments to the format of the content being displayed so that it is compatible with the new display orientation. It is also possible for the method to execute step 238 following step 230, even though the display unit 30 is not being rotated in that example, so as to ensure proper coordination across the different devices.

The preceding steps generally describe a method where the vehicle display system 50 automatically puts the rotating vehicle display unit 30 in an optimal orientation. However, the method is also designed to allow a user to manually engage the rotating vehicle display unit 30 and turn it to a desired orientation. This manual feature is illustrated in steps 250-262 and is described in the following paragraphs.

Starting with step 250, the method determines if a user wants to change the current orientation of the rotating vehicle display unit 30. This may be accomplished according to one of a number of different techniques. For example, step 250 may receive an input, such as through a touchscreen menu on the electronic display 134 or through the voice-activated HMI platform, indicating that the user wants to rotate the display unit. In a different example, step 250 senses the user physically touching a part of the rotating vehicle display unit 30, such as the frame surrounding the electronic display 134, using capacitive touch sensors or the like. In yet another example, step 250 infers the user's desire to rotate the display unit 30 by sensing a physical torque being applied, such as the case when the user simply grabs the display unit and attempts to manually rotate it. These and other techniques may be employed to determine if and when a user wants to turn the rotating vehicle display unit 30 to a different display orientation.

Next, step 254 enables the user to manually engage and turn the rotating vehicle display unit 30. In one embodiment, step 254 simply unlocks the smart fluid 124 by sending the lock/unlock signal 110 from the on-board processor 56 to the electric coil 122, thereby turning off or at least reducing the strength or intensity of the magnetic field B such that the smart fluid viscosity is decreased. The decreased viscosity of the smart fluid 124 then enables the user to more easily rotate the display unit 30. In a different embodiment, however, step 254 precisely controls the resistance that the smart fluid 124 presents against rotation of the display unit 30 and/or controls detents in the angular range of motion; this enables the vehicle display system 50 to customize the tactile feel or feedback experienced by the user.

Turning now to FIGS. 5A-D, several different schematic views are provided to illustrate how controllable resistance and/or detents may be employed. If, for example, the method determines that a user, such as a child or an elderly user, wishes to rotate the display unit 30 to a different display orientation, then step 254 may energize the electric coil 122 enough to create a mildly strong magnetic field B. Such a magnetic field will slightly increase the viscosity of the smart fluid 124 and, thus, will only present a slight amount of rotational resistance to the user trying to rotate the display unit 30; this scenario is illustrated in FIG. 5A. If, on the other hand, the method determines that a typical adult user wants to rotate the display unit 30, then the electric coil 122 is energized to a greater level such that a more powerful magnetic field B is established and the viscosity of the smart fluid 124 is further increased. With an increased viscosity or thickness, the smart fluid 124 will present a greater degree of rotational resistance to the user, such that the display unit requires more strength to rotate. This scenario is represented in FIG. 5B. The degree to which the method adjusts or controls the resistance to the torque manually applied by the user can vary by application and can be based on known or sensed preferences of the user. In one instance, step 254 controls the resistance presented by the smart fluid 124 as a function of the amount of sensed torque, as initially applied by the user (i.e., if a user grabs the display unit and begins rotating it with a substantial amount of torque, then a substantial amount of resistance will be put in place; if the user engages the display unit and begins to turn it rather gently, then a correspondingly lower amount of resistance will be put in place).

In terms of the detents, the method is able to present very precise, crisp and controllable detents that can be felt by the user as they rotate the display unit 30 through a certain angular range. Put differently, the vehicle display system 50 is able to mimic mechanical detents angularly located around the housing, but can do with greater precision, accuracy and controllability. This is different than some traditional spring-based systems, where the tactile feel and feedback is more clunky. To illustrate this feature, consider FIG. 5C which shows a portion of the rotating vehicle display unit 30 having seven discrete detents (i.e., a detent every 51° or so). When a user manually rotates the display unit 30 and the method senses that the display unit is approaching the next detent position (e.g., the display has been rotated through approximately 51°), step 254 can create the next detent by strengthening the magnetic field B such that the viscosity of the smart fluid 124 increases. When the user rotationally reaches the next detent position, the increased viscosity of the smart fluid 124 will make it feel as though the display unit has settled into a mechanical detent located at that rotational position, even though such detents do not actually exist in the housing 120 or elsewhere. Since there are not any physical detents formed in the housing, the method can adjust and change the number of detents, the angular spacing between detents, the feel of each detent, etc. This scenario is represented in FIG. 5D, where the number of detents has been reduced from seven to four. Numerous other adaptations and implementations of this feature are also possible and are within the scope of this application.

Once the user has manually rotated the display unit 30 to its desired position, step 258 causes the user interface to adapt to the new display orientation of the display unit. This step is similar to step 238 and, thus, is not reiterated here.

Now that the display unit 30 is in its desired orientation, step 262 may lock it in place. One way for step 262 to lock the rotating vehicle display unit 30 in place is for the on-board processing unit 56 to use the lock/unlock signal 110 to control the electric coil 122 such that it establishes and/or maintains the magnetic field B that, in turn, activates the smart fluid 124 so that it becomes extremely viscous and "locks" the rotating vehicle display unit 30 in the current orientation. Once the display unit is locked in place, the method may return to 230 for continued monitoring.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A rotating vehicle display unit, comprising:
   a housing;
   an electric coil;
   a rotating disk that is located in the housing;
   a smart fluid that is located in the housing and at least partially surrounds the rotating disk, the smart fluid includes a plurality of magnetic particles suspended in a carrier fluid so that a viscosity of the smart fluid is affected by a presence of magnetic field; and
   a rotating shaft that is connected to the rotating disk and is configured to carry an electronic display, wherein when the electric coil is energized, the electric coil creates a magnetic field that permeates the smart fluid and increases the viscosity of the smart fluid so that the smart fluid resists rotation of the rotating disk within the housing.

2. The rotating vehicle display unit of claim 1, wherein the housing includes at least one opening with a dynamic hermetic seal, the rotating shaft extends through the opening and the dynamic hermetic seal seals around the rotating shaft so that the rotating shaft can rotate without the smart fluid leaking from the housing.

3. The rotating vehicle display unit of claim 1, wherein the electric coil circumferentially surrounds the rotating disk, the smart fluid, and the rotating shaft and is configured so that, when energized, the electric coil creates the magnetic field with magnetic flux lines that permeate the smart fluid throughout the housing.

4. The rotating vehicle display unit of claim 1, wherein the rotating disk is disk shaped and includes a hole in a middle of the disk and a smooth outer circumferential surface, the hole is sized and shaped to accommodate the rotating shaft and the smooth outer circumferential surface is configured to rotate against one or more bearings that are located in the housing.

5. The rotating vehicle display unit of claim 1, wherein the rotating disk includes one or more holes or perforations that are formed in planar surfaces of the rotating disk and, in which, the smart fluid is present, the holes or perforations increase interaction with the smart fluid.

6. The rotating vehicle display unit of claim 1, wherein the smart fluid is a magnetorheological (MR) fluid with the plurality of magnetic particles suspended in the carrier fluid, and when the magnetic field permeates the MR fluid it can increase the viscosity of the MR fluid to a point of a viscoelastic solid.

7. The rotating vehicle display unit of claim 1, further comprising an electric motor,
   wherein the electric motor is mounted to the housing and is connected to the rotating shaft so that, when activated, the electric motor turns the rotating shaft and rotates the electronic display between portrait and landscape display orientations.

8. The rotating vehicle display unit of claim 1, further comprising the electronic display,
   wherein the electronic display is connected to and carried by the rotating shaft and is able to display content in either portrait or landscape display orientations.

9. A method for use with a rotating vehicle display unit mounted in a vehicle, the rotating vehicle display unit includes a housing, an electric coil, a rotating disk that is located in the housing, a smart fluid that is located in the housing and at least partially surrounds the rotating disk, where smart fluid includes a plurality of magnetic particles suspended in a carrier fluid so that a viscosity of the smart fluid is affected by a presence of magnetic field, and a rotating shaft that is connected to the rotating disk and is configured to carry an electronic display, the method comprising the steps of:

detecting a change in system input information intended for the rotating vehicle display unit;

selecting an optimal display orientation for the system input information;

determining if the rotating vehicle display unit is currently in the optimal display orientation;

when the rotating vehicle display unit is currently in the optimal display orientation, then maintaining the rotating vehicle display unit in its current orientation; and when the rotating vehicle display unit is not currently in the optimal display orientation, then rotating the rotating vehicle display unit from its current orientation to an optimal orientation.

10. The method of claim 9, wherein the detecting step further comprises detecting at least one of the following changes in system input information: a change in a presence of the system input information, a change in a source of the system input information, or a change in content or format of the system input information.

11. The method of claim 9, wherein the selecting step further comprises determining the optimal display orientation for a system input with a pre-defined orientation by retrieving pre-defined orientation information from a memory device located on the vehicle.

12. The method of claim 9, wherein the selecting step further comprises determining the optimal display orientation for a system input with a non-defined orientation by comparing a number of pixels driven versus a number of pixels available to obtain a pixel ratio for each possible display orientation, and then selecting the optimal display orientation based on the pixel ratio.

13. The method of claim 9, wherein the selecting step further comprises determining the optimal display orientation for a system input with a non-defined orientation by evaluating an amount of content displayed for each possible display orientation, and then selecting the optimal display orientation based on an orientation that displays the most content.

14. The method of claim 9, wherein the selecting step further comprises determining the optimal display orientation for a system input with a non-defined orientation by obtaining user preferences or aggregate past histories of users for a particular system input, and then selecting the optimal display orientation based on the obtained user preferences or aggregate past histories.

15. The method of claim 9, wherein the maintaining step further comprises energizing the electric coil such that a magnetic field is established, increasing the viscosity of the smart fluid in response to the magnetic field, and locking the rotating vehicle display unit in the current orientation in response to the increased viscosity of the smart fluid.

16. The method of claim 9, wherein the rotating step further comprises deenergizing the electric coil such that a magnetic field is not established or is reduced, decreasing the viscosity of the smart fluid in response to a lack of or reduced magnetic field, unlocking the rotating vehicle display unit in response to the decreased viscosity of the smart fluid, and engaging an electric motor to rotate the rotating vehicle display unit from the current orientation to the optimal orientation.

17. The method of claim 9, further comprising the steps of:

determining if a user wants to change a current orientation of the rotating vehicle display unit; and when the user wants to change the current orientation of the rotating vehicle display unit, then controlling a magnetic field created by the electric coil so that the smart fluid exhibits viscosity that allows the user to manually engage and turn the rotating vehicle display unit to a desired orientation.

18. The method of claim 17, wherein the step of controlling the magnetic field created by the electric coil further comprises adjusting a resistance presented by the smart fluid against rotation of the rotating vehicle display unit.

19. The method of claim 18, wherein an amount of the resistance presented by the smart fluid is a function of an amount of torque exerted by the user on the rotating vehicle display unit.

20. The method of claim 17, wherein the step of controlling the magnetic field created by the electric coil further comprises providing a plurality of detents at different rotational positions, where the detents are created by the smart fluid.

* * * * *